(12) United States Patent  (10) Patent No.: US 8,037,071 B2
Venkataraman et al.  (45) Date of Patent: *Oct. 11, 2011

(54) METHODS AND SYSTEMS FOR DYNAMICALLY REARRANGING SEARCH RESULTS INTO HIERARCHICALLY ORGANIZED CONCEPT CLUSTERS

(75) Inventors: Sashikumar Venkataraman, Andover, MA (US); Pankaj Garg, Patiala (IN); Pranav Rajanala, Bangalore (IN)

(73) Assignee: Veveo, Inc., Andover, MA (US)

( * ) Notice: Subject to any disclaimer, the term of this patent is extended or adjusted under 35 U.S.C. 154(b) by 354 days.

This patent is subject to a terminal disclaimer.

(21) Appl. No.: 12/423,448

(22) Filed: Apr. 14, 2009

(65) Prior Publication Data

US 2009/0198688 A1    Aug. 6, 2009

Related U.S. Application Data

(63) Continuation of application No. 11/855,661, filed on Sep. 14, 2007, now Pat. No. 7,536,384.

(60) Provisional application No. 60/825,616, filed on Sep. 14, 2006.

(51) Int. Cl.
    *G06F 17/30* (2006.01)
(52) U.S. Cl. ........................................ 707/736; 707/737
(58) Field of Classification Search .................. 707/759, 707/769, 776, 736, 737, 797
    See application file for complete search history.

(56) References Cited

U.S. PATENT DOCUMENTS

| | | | |
|---|---|---|---|
| 1,261,167 A | 4/1918 | Russell | |
| 4,453,217 A | 6/1984 | Boivie | |
| 4,760,528 A | 7/1988 | Levin | |
| 4,893,238 A | 1/1990 | Venema | |
| 5,224,060 A | 6/1993 | Ma et al. | |
| 5,337,347 A | 8/1994 | Halstead-Nussloch et al. | |
| 5,369,605 A | 11/1994 | Parks | |
| 5,487,616 A | 1/1996 | Ichbiah | |

(Continued)

FOREIGN PATENT DOCUMENTS

EP     1050794     11/2000

(Continued)

OTHER PUBLICATIONS

Nardi, et al., "Integrating Communication and Information through Contact Map," Communcation of the ACM, vol. 45, No. 4, Apr. 2002, 7 pages, retrieved from URL:http://portal.acm.org/citation.cfm?id+505251>.

(Continued)

*Primary Examiner* — Charles Rones
*Assistant Examiner* — Fariborz Khoshnoodi
(74) *Attorney, Agent, or Firm* — Wolf, Greenfield & Sacks, P.C.

(57) ABSTRACT

Methods of and systems for dynamically rearranging search results into hierarchically organized concept clusters are provided. A method of searching for and presenting content items as an arrangement of conceptual clusters to facilitate further search and navigation on a display-constrained device includes providing a set of content items and receiving incremental input to incrementally identify search terms for content items. Content items are selected and grouped into sets based on how the incremental input matches various metadata associated with the content items. The selected content items are grouped into explicit conceptual clusters and user-implied conceptual clusters based on metadata in common to the selected content items. The clustered content items are presented according to the conceptual clusters into which they are grouped.

8 Claims, 10 Drawing Sheets

U.S. PATENT DOCUMENTS

| | | |
|---|---|---|
| 5,532,754 A | 7/1996 | Young et al. |
| 5,623,406 A | 4/1997 | Ichbiah |
| 5,635,989 A | 6/1997 | Rothmuller |
| 5,745,889 A | 4/1998 | Burrows |
| 5,774,588 A | 6/1998 | Li |
| 5,805,155 A | 9/1998 | Allibhoy et al. |
| 5,818,437 A | 10/1998 | Grover et al. |
| 5,828,420 A | 10/1998 | Marshall et al. |
| 5,828,991 A | 10/1998 | Skiena et al. |
| 5,835,087 A | 11/1998 | Herz et al. |
| 5,859,662 A | 1/1999 | Cragun et al. |
| 5,880,768 A | 3/1999 | Lemmons et al. |
| 5,912,664 A | 6/1999 | Eick et al. |
| 5,937,422 A | 8/1999 | Nelson et al. |
| 5,945,928 A | 8/1999 | Kushler et al. |
| 5,945,987 A | 8/1999 | Dunn |
| 5,953,541 A | 9/1999 | King et al. |
| 6,005,565 A | 12/1999 | Legall et al. |
| 6,005,597 A | 12/1999 | Barrett et al. |
| 6,006,225 A | 12/1999 | Bowman et al. |
| 6,009,459 A | 12/1999 | Belfiore et al. |
| 6,011,554 A | 1/2000 | King et al. |
| 6,047,300 A | 4/2000 | Walfish et al. |
| 6,075,526 A | 6/2000 | Rothmuller |
| 6,133,909 A | 10/2000 | Schein et al. |
| 6,184,877 B1 | 2/2001 | Dodson et al. |
| 6,189,002 B1 | 2/2001 | Roitblat |
| 6,223,059 B1 | 4/2001 | Haestrup et al. |
| 6,260,050 B1 | 7/2001 | Yost et al. |
| 6,266,048 B1 | 7/2001 | Carau, Sr. |
| 6,266,814 B1 | 7/2001 | Lemmons et al. |
| 6,269,361 B1 | 7/2001 | Davis et al. |
| 6,286,064 B1 | 9/2001 | King et al. |
| 6,307,548 B1 | 10/2001 | Flinchem et al. |
| 6,307,549 B1 | 10/2001 | King et al. |
| 6,377,945 B1 | 4/2002 | Risvik et al. |
| 6,385,602 B1 | 5/2002 | Tso et al. |
| 6,438,751 B1 | 8/2002 | Voyticky et al. |
| 6,466,933 B1 | 10/2002 | Huang et al. |
| 6,529,903 B2 | 3/2003 | Smith |
| 6,564,213 B1 | 5/2003 | Ortega et al. |
| 6,594,657 B1 | 7/2003 | Livowsky et al. |
| 6,600,496 B1 | 7/2003 | Wagner et al. |
| 6,614,455 B1 | 9/2003 | Cuijpers et al. |
| 6,615,248 B1 | 9/2003 | Smith |
| 6,631,496 B1 | 10/2003 | Li et al. |
| 6,664,980 B2 | 12/2003 | Bryan et al. |
| 6,721,954 B1 | 4/2004 | Nickum |
| 6,732,369 B1 | 5/2004 | Schein et al. |
| 6,757,906 B1 | 6/2004 | Look et al. |
| 6,766,526 B1 | 7/2004 | Ellis |
| 6,772,147 B2 | 8/2004 | Wang |
| 6,785,671 B1 | 8/2004 | Bailey et al. |
| 6,801,909 B2 | 10/2004 | Delgado et al. |
| 6,839,702 B1 | 1/2005 | Patel et al. |
| 6,839,705 B1 | 1/2005 | Grooters |
| 6,850,693 B2 | 2/2005 | Young et al. |
| 6,865,575 B1 | 3/2005 | Smith |
| 6,865,746 B1 | 3/2005 | Herrington et al. |
| 6,907,273 B1 | 6/2005 | Smethers |
| 6,965,374 B2 | 11/2005 | Villet et al. |
| 7,013,304 B1 | 3/2006 | Schuetze et al. |
| 7,117,207 B1 | 10/2006 | Kerschberg et al. |
| 7,136,854 B2 | 11/2006 | Smith |
| 7,149,983 B1 | 12/2006 | Robertson et al. |
| 7,213,256 B1 | 5/2007 | Kikinis |
| 7,225,180 B2 | 5/2007 | Donaldson et al. |
| 7,225,184 B2 | 5/2007 | Carrasco et al. |
| 7,225,455 B2 | 5/2007 | Bennington et al. |
| 7,269,548 B2 | 9/2007 | Fux et al. |
| 7,293,231 B1 | 11/2007 | Gunn et al. |
| 2002/0002550 A1 | 1/2002 | Berman |
| 2002/0042791 A1 | 4/2002 | Smith et al. |
| 2002/0052873 A1 | 5/2002 | Delgado et al. |
| 2002/0059621 A1 | 5/2002 | Thomas et al. |
| 2002/0083448 A1 | 6/2002 | Johnson |
| 2002/0133481 A1 | 9/2002 | Smith et al. |
| 2002/0188488 A1 | 12/2002 | Hinkle |
| 2002/0199194 A1 | 12/2002 | Ali |
| 2003/0005452 A1 | 1/2003 | Rodriguez |
| 2003/0005462 A1 | 1/2003 | Broadus et al. |
| 2003/0011573 A1 | 1/2003 | Villet et al. |
| 2003/0014753 A1 | 1/2003 | Beach et al. |
| 2003/0023976 A1 | 1/2003 | Kamen et al. |
| 2003/0037043 A1 | 2/2003 | Chang et al. |
| 2003/0046698 A1 | 3/2003 | Kamen et al. |
| 2003/0066079 A1 | 4/2003 | Suga |
| 2003/0084270 A1 | 5/2003 | Coon et al. |
| 2003/0226146 A1 | 12/2003 | Thurston et al. |
| 2003/0237096 A1 | 12/2003 | Barrett et al. |
| 2004/0021691 A1 | 2/2004 | Dostie et al. |
| 2004/0046744 A1 | 3/2004 | Rafii et al. |
| 2004/0049783 A1 | 3/2004 | Lemmons et al. |
| 2004/0073926 A1 | 4/2004 | Nakamura et al. |
| 2004/0078815 A1 | 4/2004 | Lemmons et al. |
| 2004/0078816 A1 | 4/2004 | Johnson |
| 2004/0078820 A1 | 4/2004 | Nickum |
| 2004/0083198 A1 | 4/2004 | Bradford et al. |
| 2004/0093616 A1 | 5/2004 | Johnson |
| 2004/0111745 A1 | 6/2004 | Schein et al. |
| 2004/0128686 A1 | 7/2004 | Boyer et al. |
| 2004/0139091 A1* | 7/2004 | Shin ........................ 707/100 |
| 2004/0143569 A1 | 7/2004 | Gross et al. |
| 2004/0155908 A1 | 8/2004 | Wagner |
| 2004/0194141 A1 | 9/2004 | Sanders |
| 2004/0216160 A1 | 10/2004 | Lemmons et al. |
| 2004/0220926 A1 | 11/2004 | Lamkin et al. |
| 2004/0221308 A1 | 11/2004 | Cuttner et al. |
| 2004/0261021 A1 | 12/2004 | Mittal et al. |
| 2005/0015366 A1 | 1/2005 | Carrasco et al. |
| 2005/0071874 A1 | 3/2005 | Elcock et al. |
| 2005/0086234 A1 | 4/2005 | Tosey |
| 2005/0086691 A1 | 4/2005 | Dudkiewicz et al. |
| 2005/0086692 A1 | 4/2005 | Dudkiewicz et al. |
| 2005/0174333 A1 | 8/2005 | Robinson et al. |
| 2005/0192944 A1 | 9/2005 | Flinchem |
| 2005/0210020 A1 | 9/2005 | Gunn et al. |
| 2005/0210383 A1 | 9/2005 | Cucerzan et al. |
| 2005/0210402 A1 | 9/2005 | Gunn et al. |
| 2005/0223308 A1 | 10/2005 | Gunn et al. |
| 2005/0240580 A1 | 10/2005 | Zamir et al. |
| 2005/0246311 A1* | 11/2005 | Whelan et al. ................ 707/1 |
| 2005/0246324 A1 | 11/2005 | Paalasmaa et al. |
| 2005/0278175 A1 | 12/2005 | Hyvonen |
| 2005/0283468 A1 | 12/2005 | Kamvar et al. |
| 2006/0010477 A1 | 1/2006 | Yu |
| 2006/0013487 A1 | 1/2006 | Longe et al. |
| 2006/0036640 A1* | 2/2006 | Tateno et al. ................ 707/102 |
| 2006/0059044 A1 | 3/2006 | Chan et al. |
| 2006/0075429 A1 | 4/2006 | Istvan et al. |
| 2006/0090182 A1 | 4/2006 | Horowitz et al. |
| 2006/0090185 A1 | 4/2006 | Zito et al. |
| 2006/0090812 A1 | 5/2006 | Summerville |
| 2006/0101499 A1 | 5/2006 | Aravamudan et al. |
| 2006/0101503 A1 | 5/2006 | Venkataraman |
| 2006/0101504 A1 | 5/2006 | Aravamudan et al. |
| 2006/0112162 A1 | 5/2006 | Marot et al. |
| 2006/0117019 A1 | 6/2006 | Sylthe et al. |
| 2006/0163337 A1 | 7/2006 | Unruh |
| 2006/0167676 A1 | 7/2006 | Plumb |
| 2006/0167859 A1 | 7/2006 | Verbeck Sibley et al. |
| 2006/0173818 A1 | 8/2006 | Berstis et al. |
| 2006/0190308 A1 | 8/2006 | Janssens et al. |
| 2006/0195435 A1 | 8/2006 | Laird-McConnell et al. |
| 2006/0206454 A1 | 9/2006 | Forstall et al. |
| 2006/0256078 A1 | 11/2006 | Flinchem et al. |
| 2006/0274051 A1 | 12/2006 | Longe et al. |
| 2007/0005563 A1 | 1/2007 | Aravamudan |
| 2007/0016476 A1 | 1/2007 | Hoffberg et al. |
| 2007/0027852 A1 | 2/2007 | Howard et al. |
| 2007/0050337 A1 | 3/2007 | Venkataraman et al. |
| 2007/0050348 A1 | 3/2007 | Aharoni et al. |
| 2007/0061244 A1 | 3/2007 | Ramer et al. |
| 2007/0061317 A1 | 3/2007 | Ramer et al. |
| 2007/0061321 A1 | 3/2007 | Venkataraman |
| 2007/0061754 A1 | 3/2007 | Ardhanari et al. |
| 2007/0067272 A1 | 3/2007 | Flynt et al. |

| | | | |
|---|---|---|---|
| 2007/0088681 | A1 | 4/2007 | Aravamudan et al. |
| 2007/0100650 | A1 | 5/2007 | Ramer et al. |
| 2007/0130128 | A1 | 6/2007 | Garg et al. |
| 2007/0143567 | A1 | 6/2007 | Gorobets |
| 2007/0150606 | A1 | 6/2007 | Flinchem et al. |
| 2007/0219984 | A1 | 9/2007 | Aravamudan et al. |
| 2007/0219985 | A1 | 9/2007 | Aravamudan et al. |
| 2007/0255693 | A1 | 11/2007 | Ramaswamy et al. |
| 2007/0260703 | A1 | 11/2007 | Ardhanari et al. |
| 2007/0266021 | A1 | 11/2007 | Aravamudan et al. |
| 2007/0266026 | A1 | 11/2007 | Aravamudan et al. |
| 2007/0266406 | A1 | 11/2007 | Aravamudan et al. |
| 2007/0271205 | A1 | 11/2007 | Aravamudan et al. |
| 2007/0276773 | A1 | 11/2007 | Aravamudan et al. |
| 2007/0276821 | A1 | 11/2007 | Aravamudan et al. |
| 2007/0276859 | A1 | 11/2007 | Aravamudan et al. |
| 2007/0288456 | A1 | 12/2007 | Aravamudan et al. |
| 2007/0288457 | A1 | 12/2007 | Aravamudan et al. |
| 2008/0071771 | A1 | 3/2008 | Venkataraman et al. |
| 2008/0086704 | A1 | 4/2008 | Aravamudan |
| 2008/0114743 | A1 | 5/2008 | Venkataraman et al. |
| 2008/0209229 | A1 | 8/2008 | Ramakrishnan et al. |

FOREIGN PATENT DOCUMENTS

| | | |
|---|---|---|
| EP | 1143691 | 10/2001 |
| EP | 1338967 | 8/2003 |
| EP | 1463307 A2 | 9/2004 |
| EP | 1622054 A1 | 2/2006 |
| WO | WO-00/70505 | 11/2000 |
| WO | WO-2004010326 | 1/2004 |
| WO | WO-2004/031931 A1 | 4/2004 |
| WO | WO-2005/033967 A3 | 4/2005 |
| WO | WO-2005/084235 A2 | 9/2005 |

OTHER PUBLICATIONS

Supplemental European Search Report for 06838179.7 dated Dec. 9, 2009, 7 pages.
Turski, et al., "Inner Circle—People Centered Email Client," CHI 2005 Conference on Human Factors in Computing System, Apr. 2005, pp. 1845-1848, 4 pages, retrieved from URL:http://portal.acm.org/citation.cfm?id+1056808.1057037.
International Search Report and Written Opinion, International Patent Application No. PCT/US07/67114, mailed Jul. 2, 2008 (6 pages).
International Search Report and Written Opinion, International Patent Application No. PCT/US097/78490, mailed Jul. 3, 2008 (6 pages).
International Search Report, International Application No. PCT/US06/25249, mailed Jan. 29, 2008 (2 pages).
International Search Report, International Application No. PCT/US06/33204, mailed Sep. 21, 2007 (2 pages).
International Search Report, International Application No. PCT/US06/40005, mailed Jul. 3, 2007 (4 Pages).
International Search Report, International Application No. PCT/US07/65703, mailed Jan. 25, 2008 (2 pages).
International Search Report, International Application No. PCT/US07/67100, mailed Mar. 7, 2008 (2 pages).
Supplemental European Search Report for PCT/US2005040415, dated Aug. 11, 2009, 15 pages.
Supplemental European Search Report for PCT/US2005040424, dated Aug. 20, 2009, 13 pages.
Written Opinion of the International Searching Authority, International Application No. PCT/US06/25249, mailed Jan. 29, 2008 (4 pages).
Written Opinion of the International Searching Authority, International Application No. PCT/US06/33204, mailed Sep. 21, 2007 (3 pages).
Written Opinion of the International Searching Authority, International Application No. PCT/US06/40005, mailed Jul. 3, 2007 (4 Pages).
Written Opinion of the International Searching Authority, International Application No. PCT/US07/65703, mailed Jan. 25, 2008 (4 pages).
Written Opinion of the International Searching Authority, International Application No. PCT/US07/67100, mailed Mar. 7, 2008 (3 pages).
Complaint in *Veveo, Inc. v. Verizon Services Corp., Verizon Communications Inc., and Verizon Data Services India Pvt. Ltd.*, U.S. District Court Southern District of New York, Civil Action No. 10-CIV-6709 (JFK), filed Sep. 9, 2010, pp. 1-14.
First Amended Complaint in *Veveo, Inc. v. Verizon Services Corp., Verizon Communications Inc., and Verizon Data Services LLC*, U.S. District Court Southern District of New York, Civil Action No. 10-CIV-6709 (JFK), filed Nov. 16, 2010, 16 pages.
Verizon's Answer to First Amended Complaint and Counterclaims in *Veveo, Inc. v. Verizon Services Corp., Verizon Communications Inc., and Verizon Data Services LLC*, U.S. District Court Southern District of New York, Civil Action No. 10-CIV-6709 (JFK), filed Dec. 9, 2010, pp. 1-17.
Supplementary European Search Report and Search Opinion for European Patent Application No. 07 84 2499.
Supplemental European Search Report for 07761026.9 dated Jan. 28, 2010, 8 pages.
Ardissono, L. et al., User Modeling and Recommendation Techniques for Personalized Electronic Program Guides, Personalized Digital Television, Editors: Ardissono, et al., Kluwer Academic Press, 2004.
Dalianis, "Improving search engine retrieval using a compound splitter for Swedish," Abstract of presentation at Nodalida 2005—15th Nordic Conference on Computational Linguistics, Joensuu Finland, May 21-22, 2005. Retrieved Jan. 5, 2006 from http://phon.joensuu.fi/nodalida/abstracts/03.shtml, 3 pages.
Digital Video Broadcasting, http://www.dvb.org (Oct. 12, 2007).
Gadd, Phonix: The Algorith, Program, vol. 24(4), Oct. 1990 (pp. 363-369).
Good, N. et al., Combining Collaborative Filtering Personal Agents for Better Recommendations, in Proc. of the 16th National Conference on Artificial Intelligence, pp. 439-446, Orlando, Folrida, Jul. 18-22, 1999.
MacKenzie et al., LetterWise: Prefix-based disambiguation for mobile text input, Proceedings of the ACM Symposium on User Interface Software and Technology—UIST2001, pp. 111-120.
Matthom, "Text Highlighting in Search Results", Jul. 22, 2005. Available at www.matthorn.com/archive/2005/07/22/text-highlighting-in-search-results; retrieved Jun. 23, 2006. (4 pages).
Mokotoff, Soundexing and Genealogy, Available at http://www.avotaynu.com/soundex.html, retrieved Mar. 19, 2008, last updated Sep. 8, 2007 (6 pages).
Press Release from Tegic Communications, Tegic Communications is awarded patent for Japanese T9(R) text input software from the Japan Patent Office, Oct. 12, 2004. Retrieved Nov. 18, 2005 from http://www.tegic.com/press_view.html?release_num=55254242.
Review of Personalization Technologies: Collaborative Filtering vs. ChoiceStream's Attributized Bayesian Choice Modeling, Technology Brief, ChoiceStream Technologies, Cambridge, MA.
Silfverberg et al., Predicting text entry speed on mobile phones, Proceedings of the ACM Conference on Human Factors in Computing System—Chi, 2000. pp. 1-16.
Talbot, David. "Soul of a New Mobile Machine." *Technology Review: The Design Issue* May/Jun. 2007. (pp. 46-53).
Wikipedia's entry for Levenshtein distance (n.d.). Retrieved Nov. 15, 2006 from http://en.wikipedia.org/wiki/Levenshtein_distance.

\* cited by examiner

METHODS AND SYSTEMS FOR DYNAMICALLY REARRANGING SEARCH RESULTS INTO HIERARCHICALLY ORGANIZED CONCEPT CLUSTERS

CROSS-REFERENCE TO RELATED APPLICATIONS

This application is a continuation of U.S. application Ser. No. 11/855,661 filed Sep. 14, 2007, which claims priority to U.S. Provisional Application Ser. No. 60/825,616, filed Sep. 14, 2006.

This application is related to the following applications, the contents of which are incorporated by reference herein:

- U.S. patent application Ser. No. 11/136,261, entitled Method And System For Performing Searches For Television Programming Using Reduced Text Input, filed on May 24, 2005, which claims priority to U.S. Provisional Patent Application No. 60/626,274, entitled Television Systems and Associated Methods, filed on Nov. 9, 2004, and U.S. Provisional Patent Application No. 60/664,879, entitled Method And System For Performing Searches For Television Programming Using Reduced Text Input, filed on Mar. 24, 2005;
- U.S. patent application Ser. No. 11/312,908, entitled Method And System For Dynamically Processing Ambiguous, Reduced Text Search Queries And Highlighting Results Thereof, filed on Dec. 20, 2005, which claims priority to U.S. Provisional Patent Application No. 60/711,866, entitled A Dynamic Highlighting Interface Of Multiword Prefixes Of Results Obtained By Incremental Search With Reduced Text Entry On Television And Mobile Devices Using A Keypad With Overloaded Keys, filed on Aug. 26, 2005, and U.S. Provisional Patent Application No. 60/716,101, entitled Method And System For Incremental Search With Reduced Text Entry Using A Reduced Keypad With Overloaded Keys, filed Sep. 12, 2005; and
- U.S. patent application Ser. No. 11/235,928, entitled Method And System For Processing Ambiguous, Multiterm Search Queries, filed on Sep. 27, 2005, which claims priority to U.S. Provisional Patent Application No. 60/716,101, entitled Method And System For Incremental Search With Reduced Text Entry Using A Reduced Keypad With Overloaded Keys, filed Sep. 12, 2005, and U.S. Provisional Patent Application No. 60/711,866, entitled A Dynamic Highlighting Interface Of Multiword Prefixes Of Results Obtained By Incremental Search With Reduced Text Entry On Television And Mobile Devices Using A Keypad With Overloaded Keys, filed on Aug. 26, 2005.

BACKGROUND

1. Field of Invention

The present invention relates to a method of selecting and presenting content and, more specifically, to a method of dynamically combining and organizing content into hierarchical clusters to facilitate user discovery of desired information.

2. Description of Related Art

One measure of the usability of an information finding and presentation system on input and/or display constrained devices is the effort expended by the user in the discovery of desired information (the discovery of information could be text based search, browsing a content space, or some combination of both). One method of minimizing the effort expended to find information (either via search or browse techniques) on input and display constrained devices is the use of incremental search techniques. The use of incremental search, where results are retrieved as user types in each character, is far superior to full word search interfaces on input constrained device, because incremental search reduces the amount of text the user must input (See, for example, the techniques presented in the applications incorporated below).

However, one of the challenges in an incremental search system is to present the most relevant results to the user even when the input is sparse or is of an ambiguous nature, such as input using an overloaded keypad with multiple alphanumeric characters mapped to the same physical key. For example, a pure lexical match on incremental input would fail to yield good results where exact matches on prefixes are rated as more relevant than partial word matches. Furthermore, if the input method is using an overloaded keypad, generating an ambiguous text input, then the problem is even worse.

In addition, ambiguous text inputs can match a wide variety of results because of the nature of the ambiguous input. This is so because the ambiguous input not only represents the search input intended by the user, but can also represent other words or phrases. For example, using the well-known 12-key telephone keypad, the input "227" represents both "car" and "bar", which can match very different results. Thus, while incremental, ambiguous text input is a convenient way to enter search input on an input constrained device, the increase in the amount of results returned can be cumbersome on a display constrained device, where only a few entries in a result set are visible.

SUMMARY OF THE INVENTION

The invention provides a method of dynamically rearranging search results for an incremental search query into hierarchically organized concept clusters.

Under one aspect of the invention, a method of searching for and presenting content items as an arrangement of conceptual clusters to facilitate further search and navigation on a display-constrained device includes providing a relatively large set of content items. At least some of the content items have metadata to specify explicit concepts associated with the content items. At least some of the metadata include phrases having more than one metadata term. The method further includes receiving from a user incremental input to incrementally identify more than one search term for desired content items and selecting from the relatively large set of content items: a first set of content items, wherein all search terms match metadata terms of a single one of the metadata phrases of each content item of said first set, a second set of content items, wherein a first subset of the search terms matches at least one metadata term of at least a first metadata phrase of each content item of said second set, and a third set of content items, wherein a second subset of the search terms matches at least one metadata term of at least a second metadata phrase of each content item of said third set, the first metadata phrase differing from the second metadata phrase. The method also includes grouping the content items the second and third sets have in common to form an intersection set for user-implied concepts inferred from the explicit concepts associated with the metadata of the content items of the intersection set and organizing the content items of the first set and the intersection set into conceptual cluster sets. The content items of the first set are organized into explicit conceptual cluster sets based on the metadata phrases having metadata terms matching the search terms so that content items having a same metadata phrase matching the search terms are clustered together. The content items of the intersection set are organized into user-implied conceptual clusters based on at least the first and second metadata phrases the content items of the intersection set have in common so that content items having same first and second metadata phrases matching the search terms are clustered together. The method includes presenting the content items organized into the explicit conceptual cluster sets and the user-implied conceptual cluster sets. Each explicit conceptual cluster set is identified based on the metadata phrase common to the content items of said explicit conceptual cluster set having metadata terms matching the search terms. Each user-implied conceptual cluster set is identified based on the first and second metadata phases the content items of said user-implied conceptual cluster set have in common.

Under another aspect of the invention, the incremental input is ambiguous text input; the ambiguous text input has one or more digits; and each digit represents more than one alphanumeric character.

Under a further aspect of the invention, the method further comprises modifying the metadata terms of at least one of the metadata phrases of at least some of the content items based on at least one of the date, day, and time of the incremental input.

Under yet another aspect of the invention, the presenting the content items is on a display-constrained device.

Under yet a further aspect of the invention, the incremental input comprises at least two prefixes in an ordered format and/or at least two prefixes in an unordered format. The incremental input can comprise at least two prefixes separated by a word separator.

Under an aspect of the invention, the organized content items are ordered for presentation in accordance with a given relevance function. The relevance function comprises at least one of temporal relevance of the content items, location relevance of the content items, popularity of the content items, and preferences of the user.

Under another aspect of the invention, at least some of the metadata terms include phonetically equivalent terms to the explicit concepts associated with at least some of the content items and/or commonly misspelled terms of the terms of the metadata phrases.

Under yet another aspect of the invention, the method further comprises organizing the content items of the large set of content items into a predetermined hierarchy based on a relationship between the informational content of the content items. The metadata to specify the explicit concepts associated with the content items is selected based on the predetermined hierarchy.

Under an aspect of the invention, a system for searching for and presenting content items as an arrangement of conceptual clusters to facilitate further search and navigation on a display-constrained device includes a database stored in an electronically readable medium for cataloging a relatively large set of content items. At least some of the content items have metadata to specify explicit concepts associated with the content items. At least some of the metadata include phrases having more than one metadata term. The system also includes input logic for receiving from a user incremental input to incrementally identify more than one search term for desired content items and selection logic for selecting from the relatively large set of content items a first set of content items, wherein all search terms match metadata terms of a single one of the metadata phrases of each content item of said first set, a second set of content items, wherein a first subset of the search terms matches at least one metadata term of at least a first metadata phrase of each content item of said second set, and a third set of content items, wherein a second subset of the search terms matches at least one metadata term of at least a second metadata phrase of each content item of said third set, the first metadata phrase differing from the second metadata phrase. The system further includes grouping logic for grouping the content items the second and third sets have in common to form an intersection set for user-implied concepts inferred from the explicit concepts associated with the metadata of the content items of the intersection set and organization logic for organizing the content items of the first set and the intersection set into conceptual cluster sets. The content items of the first set are organized by the logic into explicit conceptual cluster sets based on the metadata phrases having metadata terms matching the search terms so that content items having a same metadata phrase matching the search terms are clustered together. The content items of the intersection set are organized by the logic into user-implied conceptual clusters based on at least the first and second metadata phrases the content items of the intersection set have in common so that content items having same first and second metadata phrases matching the search terms are clustered together. The system also includes presentation logic for presenting the content items organized into the explicit conceptual cluster sets and the user-implied conceptual cluster sets. Each explicit conceptual cluster set is identified based on the metadata phrase common to the content items of said explicit conceptual cluster set having metadata terms matching the search terms. Each user-implied conceptual cluster set is identified based on the first and second metadata phases the content items of said user-implied conceptual cluster set have in common.

Under another aspect of the invention, at least a portion of the database stored in an electronically readable medium is implemented in a server system remote from the user.

Under yet another aspect of the invention, at least one of the input logic, the selection logic, the grouping logic, the organization logic, and the presentation logic is implemented in a server system remote from the user.

Under a further aspect of the invention, the incremental input is ambiguous text input. The ambiguous text input has one or more digits. Each digit represents more than one alphanumeric character.

Under yet a further aspect of the invention, the system also includes modification logic for modifying the metadata terms of at least one of the metadata phrases of at least some of the content items based on at least one of the date, day, and time of the incremental input.

Under another aspect of the invention, the system also includes ranking logic for ordering the organized content items for presentation in accordance with a given relevance function. The relevance function can include at least one of temporal relevance of the content items, location relevance of the content items, popularity of the content items, and preferences of the user.

These and other features will become readily apparent from the following detailed description where embodiments of the invention are shown and described by way of illustration.

BRIEF DESCRIPTION OF THE SEVERAL VIEWS OF THE DRAWINGS

For a more complete understanding of various embodiments of the present invention, reference is now made to the following descriptions taken in connection with the accompanying drawings in which.

DETAILED DESCRIPTION

Figure 1:
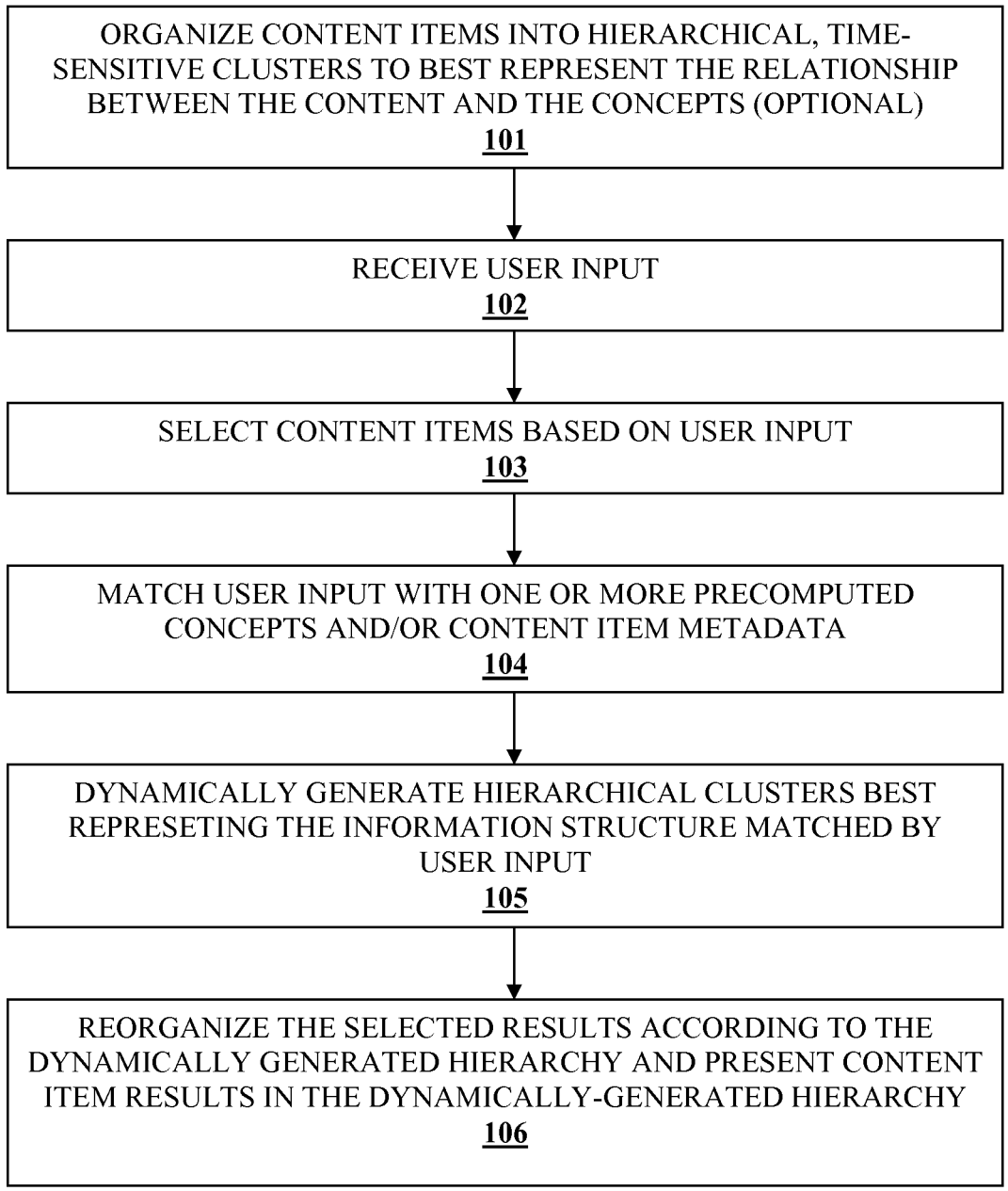
FIG. 1 illustrates a method of organizing content items and concepts into hierarchical time-sensitive concept clusters, matching incremental user input with one or more concept clusters, and generating and presenting relevant dynamic hierarchical clusters to the user.

Preferred embodiments of the invention provide methods of and systems for discovering and dynamically rearranging search results into hierarchically organized concept clusters. A concept cluster is a set of content items and/or topics that are related by one or more common themes or information types. For example, one concept cluster may be "baseball", which can contain search results related to scores of past Major League Baseball games and/or schedules for future games. In some implementations, the concept clusters are time-sensitive (described below) and include both precomputed concept clusters and dynamically generated concept clusters. The search results can include lexical matches between the content results and the incremental input of search queries, as well as matches between the incremental input and the concept cluster identifiers. This method of generating and presenting search results significantly enhances the user experience of performing incremental search for information because the hierarchical concept-driven clustering of results provides a richer organization of results. The techniques disclosed herein enable the user to more easily find the desired information content, as all results pertaining to a particular concept have been collected together. This stands in contrast to lexical matching, where results pertaining to the same concept may be interleaved among other results, which increases the cognitive load for the user.

Embodiments of the present invention build on techniques, systems and methods disclosed in earlier filed applications, including but not limited to U.S. patent application Ser. No. 11/204,546, entitled Method and System For Performing Searches For Television Content and Channels Using a Nonintrusive Television Interface and With Reduced Text Input, filed on Aug. 15, 2005; U.S. patent application Ser. No. 11/246,432, entitled Method And System For Incremental Search With Reduced Text Entry Where The Relevance Of Results Is A Dynamically Computed Function of User Input Search String Character Count, filed on Oct. 7, 2005; U.S. patent application Ser. No. 11/509,909, entitled User Interface For Visual Cooperation Between Text Input And Display Device, filed Aug. 25, 2006; U.S. patent application Ser. No. 11/561,197, entitled Method And System For Finding Desired Results By Incremental Search Using An Ambiguous Keypad With The Input Containing Orthographic and Typographic Errors, filed Nov. 17, 2006; and U.S. patent application Ser. No. 11/682,693, entitled Methods and Systems For Selecting and Presenting Content Based On Learned Periodicity Of User Content Selection, filed on Mar. 6, 2007, the contents of each of which are herein incorporated by reference. Those applications taught specific ways to perform incremental searches using ambiguous text input, methods of ordering the search results, and techniques for learning a user's behavior and preferences. The techniques disclosed in those applications can be used with the user's navigation behavior or the user's relationship to a concept cluster described herein in the same or similar ways in which the techniques are applied to the collections of content items described in those applications. The present techniques, however, are not limited to systems and methods disclosed in the incorporated patent applications. Thus, while reference to such systems and applications may be helpful, it is not believed necessary to understand the present embodiments or inventions.

FIG. 1 is a flowchart illustrating the operation of an embodiment of the invention. The flowchart illustrates a method of searching for content based on the user's incremental search input and reorganizing and presenting the results in hierarchically arranged concept clusters that are dynamically created based on the content item results returned from the search. Content items are associated with metadata that characterizes the content items. This can be done in a number of ways, including organizing the content items into a hierarchy that characterizes the content items and describes the information relationship between the content items and concepts related to the content items. In such an embodiment, content items and concept clusters are first organized into a hierarchy that best represents the relationship between concept clusters and particular content items as well as the relationship between the concept clusters themselves (step 101). Because the content is organized into clusters of the hierarchy, each concept cluster can be a parent, child, or sibling cluster relative to the other clusters in the hierarchy. Similarly, each content item can be a member of one or more concept clusters. The organization of content items into concept clusters can be performed in a precomputation step that occurs on a routine basis before the user enters the search input, or the organization step can be triggered by, and occur immediately before, processing the user's search input, described in more detail below.

As mentioned above, in some embodiments, this step can be omitted, as the content items can be maintained without a hierarchy, and later organized according to metadata associated with the content items, as described in greater detail below. Thus, in some implementations, the content items are simply associated with metadata and need not be arranged in a hierarchy. In such an embodiment, the content items have a "flat" arrangement in that there is no express hierarchy to the content item collection. The metadata associated with the content items consists of metadata phrases that can have one or more terms to describe the informational content of the content item.

The next step of the method calls for receiving search input from the user (step 102). As explained above, the search input can be incremental and ambiguous text input, entered using techniques disclosed in the incorporated applications. The search could also be based on browsing an information tree of the content. In an implementation utilizing ambiguous text input, the systems and/or devices employing the methods disclosed herein can provide for an express word separator character, i.e., a character that unambiguously identifies that one ambiguous search term has ended and another has begun. By providing an express word separator, the number of unambiguous search terms that can match the ambiguous input is reduced. Whereas, if an ambiguous character is used to represent a word separator, a text entry intended by the user to be a multiple term entry can be interpreted by a disambiguation system to be a single search term, thereby causing the search system to return results not of interest to the user. In addition, because the number of possible unambiguous search terms matching the ambiguous input is increased, the processing load on the system is increased, which can result in reduced system performance.

Content items are selected based on the user input (step 103). The content search methods in the incorporated applications is useful for this step. In one implementation, each content item is associated with one or more descriptive metadata terms. This metadata describes, for example, the types of content items, the information contained in the content items, and keywords associated with the content items. Thus, the incremental input can be compared against the various descriptive terms/metadata to identify content that matches what the user seeks.

The search input is then matched with concept clusters defined in step 101 and/or metadata associated with the content items (step 104). The match can be based on a lexical match between the user's input and one or more identifiers of the concept cluster and/or the metadata associated with the content items, for example, by using the matching and search techniques in the applications incorporated above. When a hierarchy is provided, the relative organization of the concept cluster hierarchy governs the presentation of the content items because the hierarchy determines, in part, what metadata is associated with the content items. Having identified content items, concept clusters, and metadata that match the user's input, the method determines the best hierarchical organization of the selected content items for presentation to the user to aid in the user's selection or navigation of the selected content items (step 105).

One method of hierarchically organizing the selected content items is to group the content items into explicit conceptual clusters and user-implied conceptual clusters. Explicit conceptual clusters are groups of content items that have metadata phrases with terms that match multiple terms of the user's search input. Thus, it can be said that that concept expressed by the user's input match a concept that is found explicitly in a single metadata phrase. User-implied conceptual clusters are groups of content items are related by a concept that can be inferred from the user's search input. Thus, rather than the concept being found within a single metadata phrase, the concept is formed by the coming-together of multiple metadata phrases. Thus, content items that have a first metadata phrase that matches a first portion of the user's search input and a second metadata phrase that matches a second portion of the user's search input are grouped into user-implied conceptual clusters. Explicit conceptual clusters and user-implied conceptual clusters are illustrated in the examples provided below. Finally, the method calls for reorganizing the selected content items according to the hierarchy, e.g. the conceptual clusters, determined in step 105 and presenting the selected content items in the hierarchy (step 106).

Figure 2:
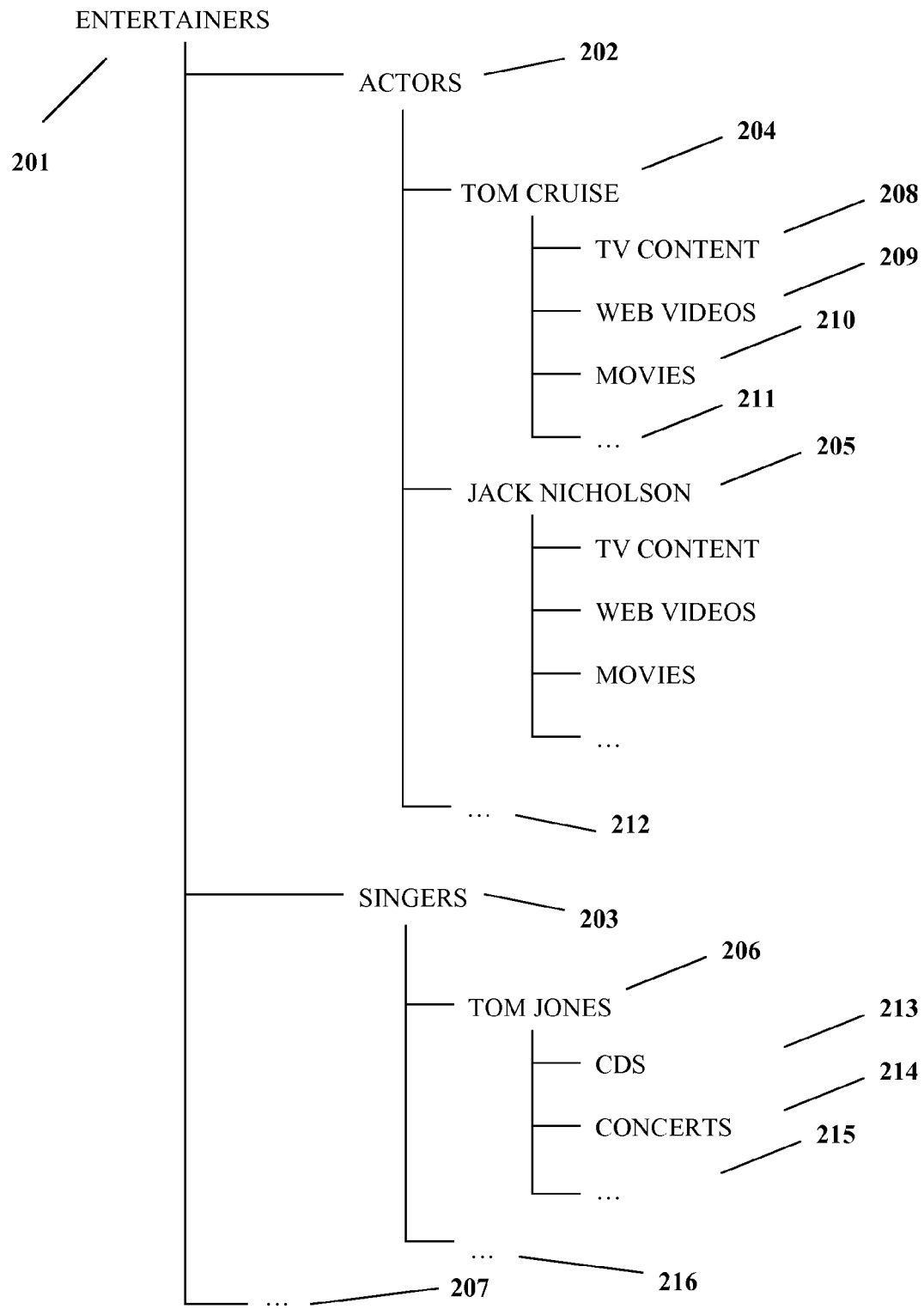
FIG. 2 illustrates a concept cluster hierarchy.

FIG. 2 is an example of an organization of information into hierarchical time-sensitive clusters (generated by step 101 of FIG. 1). FIG. 2 illustrates the organization of information and data relating to entertainers 201. The entertainers cluster is further divided into actors 202 and singers 203. Further still, personalities Tom Cruise 204 and Jack Nicholson 205 are grouped under the actors cluster 202, while Tom Jones 206 is grouped under the singers cluster 203. Note, the entertainers cluster may be a child cluster of an upper-level parent cluster; it may have sibling clusters related to other personalities; and it may have additional child clusters 207.

The Tom Cruise cluster 204 has child clusters; one such cluster would be a cluster containing all TV content 208 in which Tom Cruise appears. Another meaningful concept cluster would be a cluster of web videos 209 relating to Tom Cruise. Yet another cluster is movies 210 in which Tom Cruise appears. Further clusters 211 can be included in the information hierarchy. These clusters 208-211 are generated based on metadata associated with Tom Cruise. Because Tom Cruise is an actor, there is a wide variety of audio/video content associated with this cluster. Thus, for these audio/video content items, Tom Cruise may be a metadata phase. The Jack Nicholson cluster 205 contains child clusters similar to the Tom Cruise cluster 204 because both are actors. Further actors can be assigned to addition clusters 212. The information in these clusters is said to be time-sensitive because the information contained in the clusters or sub-clusters can change according to the time of day or date. For example, TV shows can begin playing at a certain time of day on a particular date. The organization of data can be done during the precomputation step described above, and the results are subsequently used when user performs an incremental search.

The Tom Jones cluster 206 also has child clusters, but because Tom Jones is a singer, the child clusters under the Tom Jones cluster 206 differ from those generated for the actor clusters. For example, a CDs cluster 213 containing Tom Jones music CDs available for sale, and a concerts cluster 214 listing known Tom Jones concert dates and information are found under the Tom Jones cluster 206. Thus, Tom Jones is a metadata phase associated with a concert content item. Further child clusters 215 can be included. Likewise, additional personality clusters 216 can be found under the singers cluster 203.

As mentioned above, the concept clusters can be created based on the metadata associated with the content items. However, not every metadata term may be selected to also serve as a concept cluster. For example, in one implementation, terms that occur among the metadata of the entire set of content items are used to create the concept cluster hierarchy. In a further example, the concept clusters are created based on popular categorizations of the content items. Thus, one concept cluster would be "sports", which would have sub-clusters "baseball", "basketball", etc. Another set of clusters would be "movies", which would have subclusters "genres", "actors", "directors", etc. Any meaningful organization of concept clusters can be used with the techniques disclosed herein, and the invention is not limited to any particular method of generating the clusters and the corresponding hierarchy.

Figure 3:
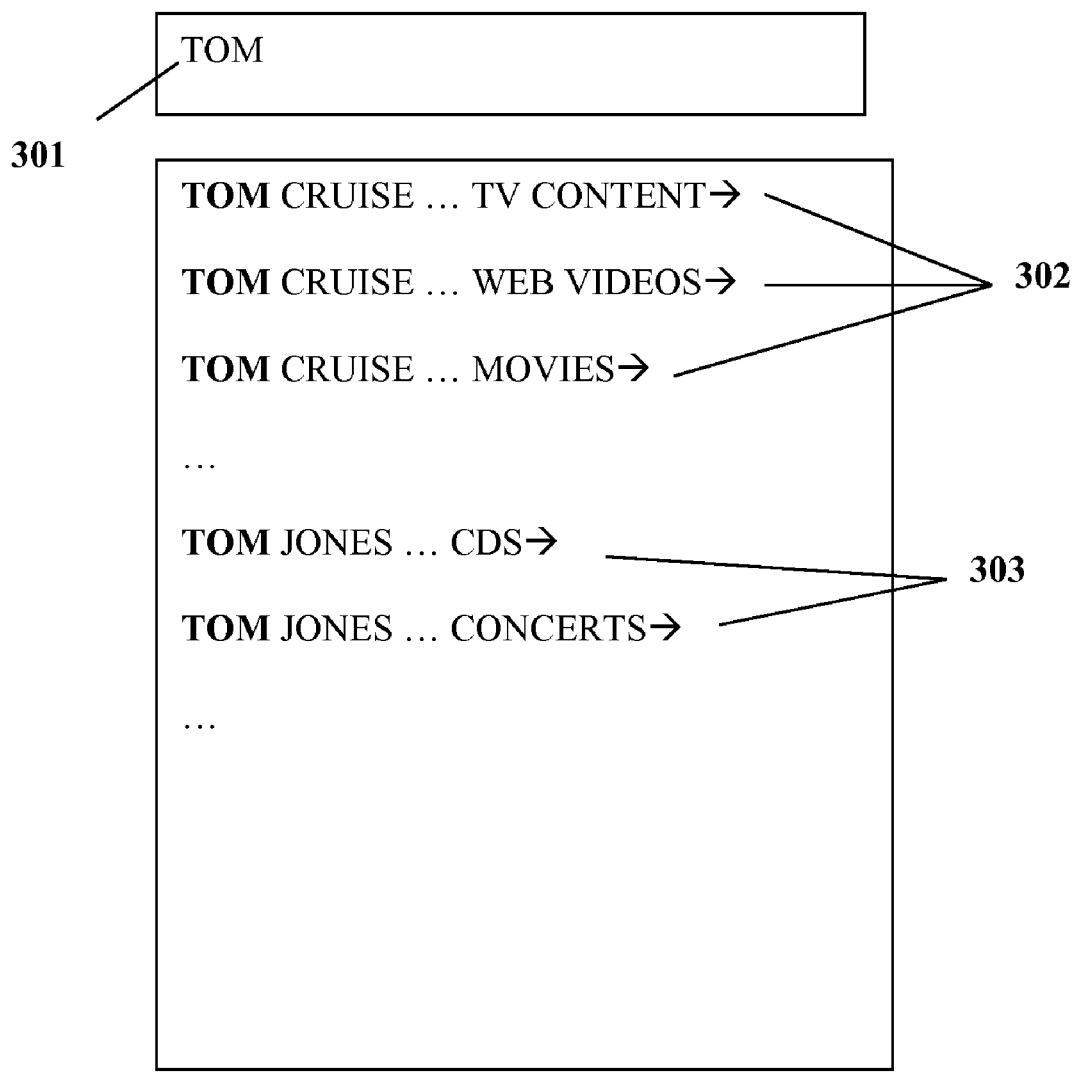
FIG. 3 illustrates different concept cluster hierarchies associated with different results.

FIG. 3 provides an example of the reorganization and presentation of search results. A user enters "Tom" 301 as a prefix for "Tom Cruise" into a system supporting incremental search. The prefix "Tom" is matched with concept clusters such as "TV content", "web videos", and "movies" by way of these clusters' relationship with the parent cluster node "Tom Cruise" 302. Thus, in this example, Tom Cruise is an explicit conceptual cluster. However, rather than presenting the TV content, web videos, and movies of Tom Cruise under a single cluster "Tom Cruise", the system dynamically creates the "Tom Cruise . . . TV Content", "Tom Cruise . . . Web Videos", and "Tom Cruise . . . Movies" clusters, effectively "flattening" a portion of the cluster hierarchy associated with Tom Cruise. This facilitates the user's selection and navigation of the results related to Tom Cruise by displaying the variety of Tom Cruise content on one screen.

The input also matches other concept clusters associated with the term "Tom", such as content related to "Tom Jones" 303, again, another example of an explicit conceptual cluster. Because Tom Jones is a singer, there are different concept sub-clusters associated with the parent cluster of "Tom Jones", for example, CDs of his music, concert dates, etc. As above, the system dynamically flattens a portion of the Tom Jones cluster hierarchy to achieve the benefits described above. The decision of whether to flatten or not flatten portions of the predefined hierarchy can be based on the number of items that would result in the list of results to be presented. The ideal number of results can be determined based on the type of device on which the techniques are employed and user preferences.

Meanwhile, the system discovers content items based on the matching techniques described in the incorporated applications and/or lexical matches of the content items' metadata with the search input "Tom". These search results are then presented in the concept cluster hierarchy determined according to the concept cluster match and reorganization described above. Thus, all content related to Tom Cruise is organized according to the sub-clusters that are child nodes under Tom Cruise; all content related to Tom Jones is organized in a similar manner under the sub-clusters associated with Tom Jones.

Figure 4:
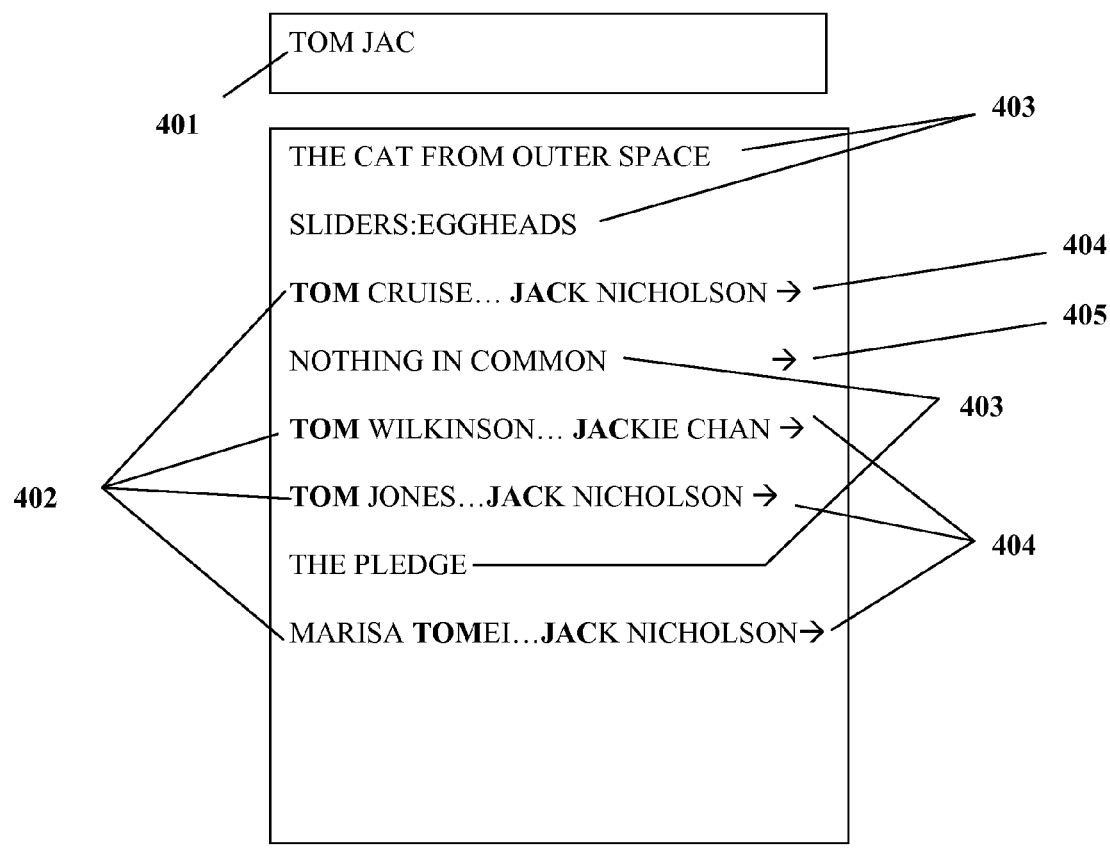
FIG. 4 illustrates an embodiment of the invention where search results for a partial prefix input are returned, including lexical matches, predetermined concept clusters, and dynamically generated concept clusters.

FIG. 4 illustrates employment of the techniques disclosed herein to reorganize search results from a partial prefix search input. The hierarchical reorganization in FIG. 4 is generated by performing lexical matches of the search input 401 against the content items and precomputed concept clusters (e.g., the clusters of FIG. 2) and dynamically generating new concept clusters 402 based on the matching results. The user incrementally inputs partial prefixes of two cast members 401. In this example, "Tom" for Tom Cruise and "Jac" for Jack Nicholson. The incremental input matches content items from a relatively large set of content items, some of which are arranged into new concept clusters 402 that are dynamically-formed (e.g., the user-implied conceptual clusters), while others are presented directly in the results presentation 403. In both cases, the partial prefix inputs 401 are matched against the results and the results are order by relevance (see the incorporated applications for methods of ordering by relevance).

Dynamically-created concept clusters 402 can be formed by creating a new cluster that will contain sub-clusters and content items that satisfy both prefixes of the search criteria, i.e., "Tom" and "Jac". This aspect will be described in greater detail below. One method of naming the dynamically-created concept clusters 402 is to combine the different clusters that came together to form the new cluster. For example, dynamically-formed concept clusters 402 that are presented to the user include "Tom Cruise . . . Jack Nicholson," "Tom Wilkinson . . . Jackie Chan," "Tom Jones . . . Jack Nicholson," and "Marisa Tomei . . . Jack Nicholson", where each person's name represents a cluster associated with that person. Thus, each of clusters 402 is an example of a user-implied conceptual cluster, in that, no single metadata phrase associated with a content item contains both personalities. The user-implied conceptual cluster is formed based on a combination of two separate metadata phrases common to multiple content items of the cluster. An arrow symbol 404 associated with the various results indicate that additional child cluster nodes and/or content items are organized beneath the result presented.

Results 403 are directly presented, i.e., are not grouped into concept clusters, and include "The Cat From Outer Space," a movie with Tom Jackman, "Nothing in Common," a movie with Jackie Gleason and Tom Hanks, "The Pledge," a movie with Jack Nicholson and Tom Noonan, and "Sliders:Eggheads" a TV show with Tom Jackson. These results 403 are not organized into dynamic concept clusters because (1) the content item contains metadata matching both partial prefix terms (i.e., an explicit conceptual cluster) and/or (2) only one result is found having the specific terms which caused the content item result to be presented. For example, "The Cat From Outer Space" appears as a match because both search terms, "Tom" and "Jac" appeared in the metadata "Tom Jackman" associated with that movie. Whereas the result "The Pledge" appears as a match because the first term "Tom" matches the metadata item "Tom Noonan" associated with the movie "The Pledge" and the second term "Jac" matches a separate metadata item "Jack Nicholson" associated with the same movie. However, in this example, no other content items are associated with both metadata terms "Tom Noonan" and "Jack Nicholson". Had other content items been discovered that also shared those two metadata, a "Tom Noonan . . . Jack Nicholson" dynamic cluster would have been created. This cluster would have contained the content item "The Pledge" as well as the other content items associated with both of these metadata terms. An arrow symbol 405 shown next to the result "Nothing in Common" indicates that that result has child nodes, such as video clips, commentaries, and/or links to vendors that sell a DVD of the movie.

One distinction of the techniques disclosed herein over other search and/or presentation methods is the non-lexical nature of concept clusters. The combination of Tom Cruise and Jack Nicholson can itself form a concept cluster. With such a concept match, the user is presented with a single result for "Tom Cruise . . . Jack Nicholson". This result can be hierarchical and contain result items, such as particular movies with both actors, and/or sub-clusters, such as lists of movies, lists of TV shows, and/or links to other content with both actors. This dynamic aggregation of results into concept clusters greatly enhances the user experience in contrast to other incremental search systems, where the match is purely lexical in nature. For example, a purely lexical-based search might return results with multiple items matching Tom Cruise and Jack Nicholson where the results of intersecting the sets of content items associated with these two persons may be mixed within other results from other lexical matches, e.g., Tom Wilkinson and Jackie Chan. Furthermore, the ordering of the mixed results may be cumbersome due to the different popularities of the individual results of this intersection.

Figure 5:
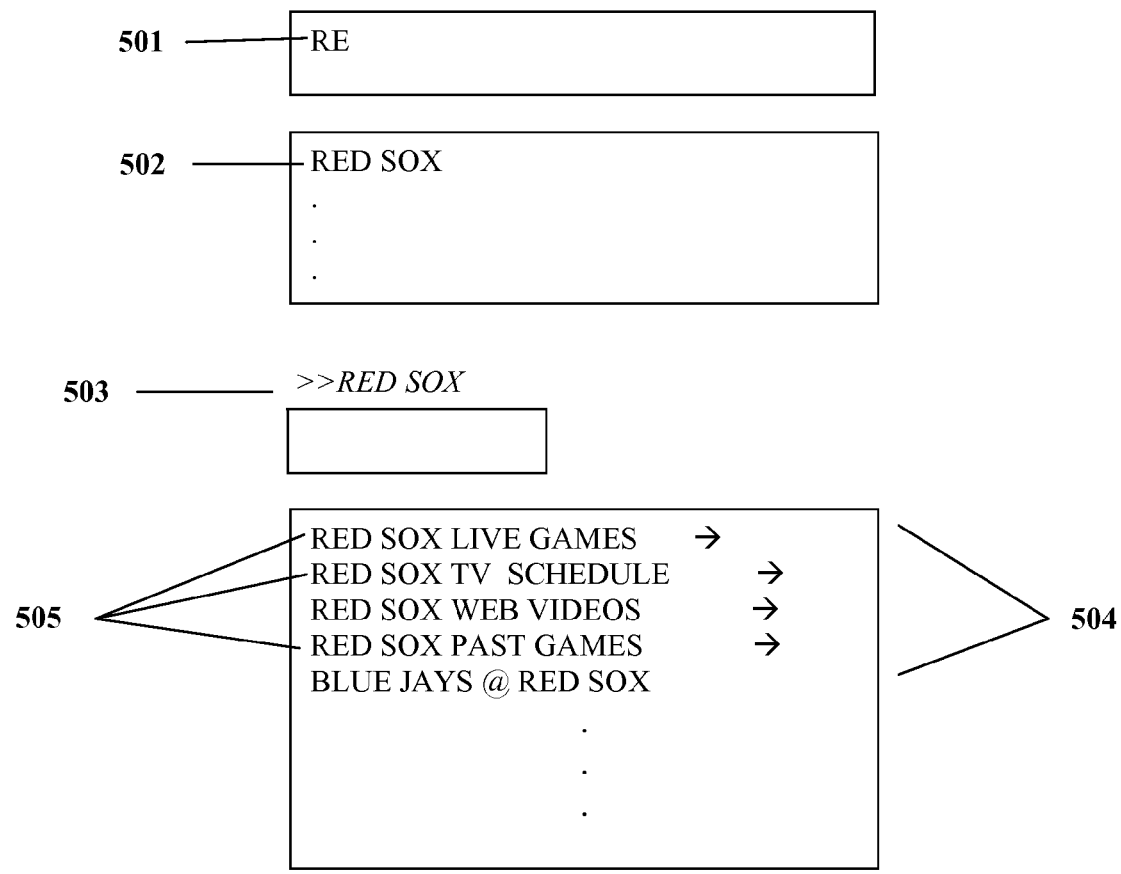
FIG. 5 illustrates the user's discovery of information, by expanding a concept cluster.

FIG. 5 illustrates the user's discovery of information, by expanding a concept cluster. In this example, the user has incrementally entered "RE" as a search term 501. The user can continue to type more text to further refine the search or navigate into one of the results returned from the incremental search. Here the concept cluster "Red Sox" 502 is one of the results currently matching the incremental text input "RE" 501. If the user navigates 503 into the "Red Sox" concept cluster (an explicit conceptual cluster), the sub-clusters within the hierarchy are displayed 504. These sub-clusters include the sub-clusters "Red Sox live games," "Red Sox TV schedule," "Red Sox past games," and "Red Sox web videos", which, in one implementation, contains only content items associated with the Red Sox in some way. The "Red Sox live games," "Red Sox TV schedule," and "Red Sox past games" sub-clusters are time-sensitive clusters 505, whose contents are dynamically adjusted with time. The "Red Sox web videos" sub-cluster is not time sensitive and does not need to be dynamically adjusted with time. A content item "Blue Jays @Red Sox" 506 is also presented among the results.

Figure 6:
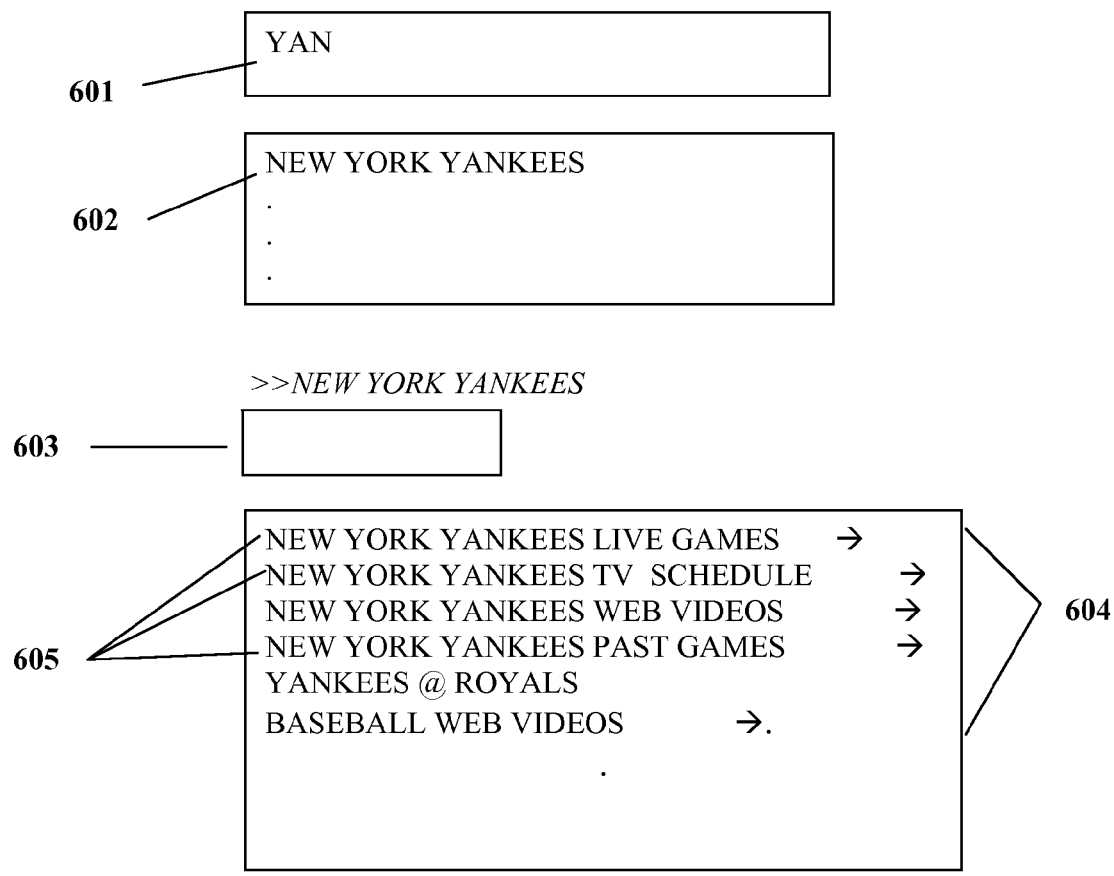
FIG. 6 illustrates the user's discovery of information, by expanding a concept cluster.

FIG. 6 illustrates the user's discovery of information, by expanding a concept cluster. In this example, the user has incrementally entered "YAN" as a search term 601. As with the previous example, the user can continue to type more text to further refine the search or navigate into one of the results returned from the incremental search. Here the concept cluster "New York Yankees" 602 is one of the results currently matching the incremental text input "YAN" 601. If the user navigates 603 into the "New York Yankees" concept cluster (an explicit conceptual cluster), the sub-clusters within the hierarchy are displayed 604. These sub-clusters include the sub-clusters "New York Yankees live games," "New York Yankees TV schedule," "New York Yankees past games," "New York Yankees web videos," and "Baseball web videos." Note, that in this example, in addition to content items associated with the New York Yankees in some way, the list includes an item associated with a related concept, namely, "Baseball web videos" 606, which is associated with the more general concept "baseball". The "New York Yankees live games," "New York Yankees TV schedule," and "New York Yankees past games" sub-clusters are time-sensitive clusters 605, whose contents are dynamically adjusted with time. The "New York Yankees web videos" and "Baseball web videos" sub-clusters are not time sensitive and do not need to be dynamically adjusted with time. A content item "Yankees @Royals" 607 is also presented.

Figure 7:
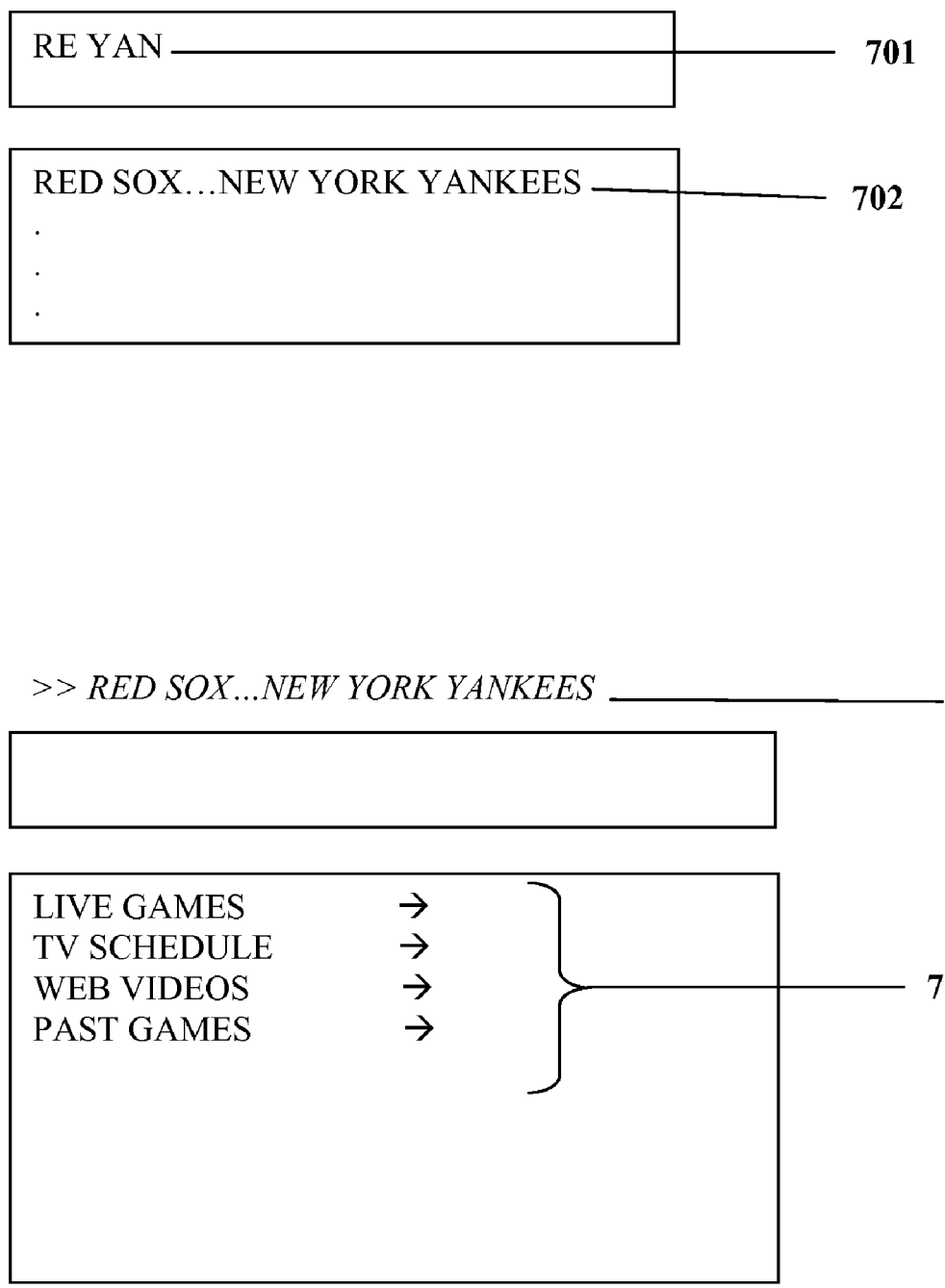
FIG. 7 illustrates the user's discovery of information, where a dynamic concept cluster is created, based on the partial prefix input entered by the user, and then the dynamic concept cluster is expanded by the user.

FIG. 7 illustrates the presentation output by one implementation of the embodiment, where the information reorganization of a dynamic concept cluster is based on the cluster hierarchy associated with clusters that are common to matches of multiple terms in the user's incremental partial prefix input. In this example, the user has incrementally entered "RE YAN" as a search input 701. Again, the user can continue to type more text to further refine the search or navigate into one of the results returned from the incremental search. In response to the input, the concept cluster "Red Sox . . . New York Yankees" 702 is one of the results currently matching the incremental text input "RE YAN" 701. The "Red Sox . . . New York Yankees" cluster 702 is dynamically created by intersecting the two concepts "Red Sox" and "New York Yankees" (thus, forming a user-implied conceptual cluster). During the pre-computation step (step 101 of FIG. 1), the concept "Red Sox" was related to the concept "baseball", as was the concept "New York Yankees."

Because both the concept "Red Sox" and the concept "New York Yankees" are related to the concept "baseball", the dynamic, user-implied, concept cluster "Red Sox . . . . New York Yankees" 702 is created and content associated with matches of the two input terms, "RE" and "YAN", are organized according to the hierarchy of the shared parent concept "baseball" and presented to the user. Similar to previous examples, if the user selects the "Red Sox . . . New York Yankees" concept cluster 702, the sub-clusters from the intersection of the two concepts are displayed 704. In this case, the dynamically-formed intersection clusters are "Live Games," "TV schedule," "web videos," and "past games." Again, this organization is governed by the information hierarchy associated with the parent concept "baseball", which can be determined during the precomputation step described above. Thus, "Live Games," "TV schedule," "web videos," and "past games" are selected as clusters because they are common types of content items associated with the broader concept "baseball". Note, the content item "Blue Jays @ Red Sox" 506 of FIG. 5, the content item "Yankees @ Royals" 607 of FIG. 6, and concept cluster "Baseball Web Videos" 606 of FIG. 6 are not included in the newly formed concept cluster structure presented in FIG. 7. This is so because those content items and clusters did not match both inputs "RE" and "YAN".

The dynamic intersection of concepts is also performed if the user first entered "RE" and then selected the "Red Sox" concept (as described in connection with FIG. 5) and then typed "YAN" while in the "Red Sox" concept cluster. Similarly, the user can browse a tree arrangement of information nodes to arrive at a similar result. Thus, the user could browse to a top-level node "Sports", followed by selection of the child node "Major League Baseball", further followed by selection of the "Red Sox" node. Once in the "Red Sox" cluster, the user could enter the search term "YAN" to complete the dynamic intersection of the concept clusters "Red Sox" and "New York Yankees". In the alternate, the user could indicate through the interface that the "Red Sox" cluster is to be part of a dynamic intersection query and browse up the tree to find the "New York Yankees" cluster and add that cluster to the intersection.

A system implementing such a search can be configured to enable this type of search method by maintaining the query state of the user's search session, e.g., the system tracks that the user is current browsing within the "Red Sox" concept. Thus, when the user begins to enter text after having browsed to the concept cluster "Red Sox", the system would use the new text entry along with the current cluster to form the completed query rather than take the new text entry as a standalone query entry. Such a system can also be configurable to not track the state of the user, in which case, the new text entry would be treated as a standalone query. Similarly, a device implementing such a system can provide an "escape" key that would allow the user to reset the query state, providing the ability to enter a new standalone query regardless of the user's location in the content hierarchy.

Figure 8:
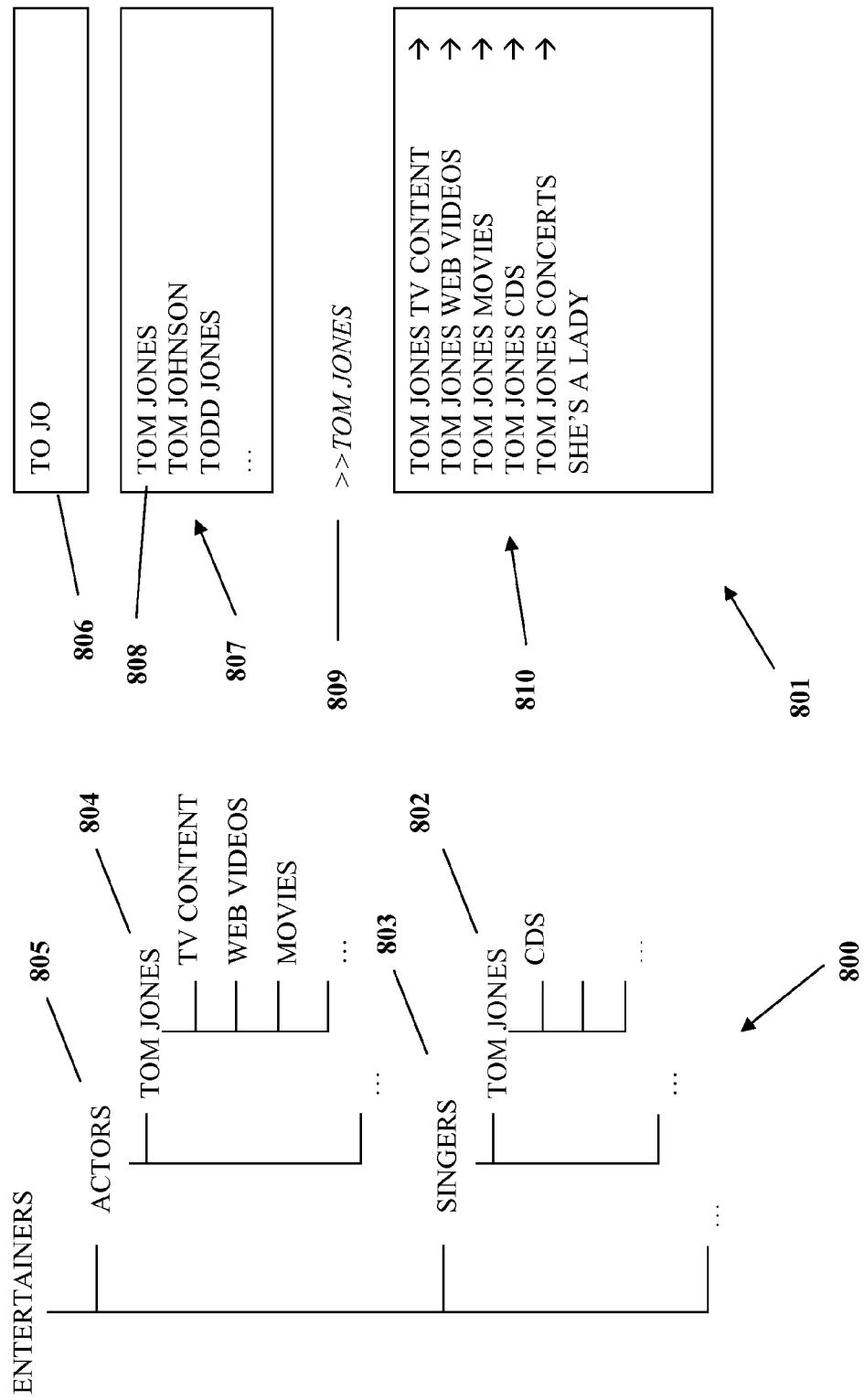
FIG. 8 illustrates a concept cluster hierarchy and the user's discovery of information, by conflating concept clusters.

The description above illustrates how the precomputed cluster hierarchy can be flattened and/or merged to form a new hierarchy into which content items are organized for presentation. Concept clusters can also be combined to form new, conflated concept clusters, which contain an aggregation of content items that are otherwise organized in different clusters. For example, FIG. 8 illustrates another possible concept cluster hierarchy 800 and an example of the formation of a dynamically-formed, conflated concept cluster 801. In this hierarchy, a Tom Jones cluster 802 is organized under the singers cluster 803. However, there is also a Tom Jones cluster 804 under the actors cluster 805 because he has appeared in a movie, there are web videos about him, and some of his concerts have been televised. Thus, when the user enters the incremental search text "TO JO" 806, the content items under the Tom Jones singer cluster 802 and Tom Jones actor cluster 804 will be returned because "TO" incrementally matches "Tom" and "JO" incrementally matched "Jones". This is another example of an explicit conceptual cluster. In addition, content items for other personalities matching the search text may be returned, such as content items for composer "Tom Johnson", baseball player "Todd Jones", and other matches. Each of these personalities can have corresponding concept clusters.

In order to assist the user in finding the desired content items, the system can organize the content items according to the associated personality concept clusters 807. Thus, the system will dynamically create a general concept cluster for Tom Jones 808 and combine the sub-clusters under the Tom Jones actor cluster 804 and the sub-clusters under the Tom Jones singer cluster 802 so they are grouped under the dynamically-formed general Tom Jones cluster 808. Thus, the user can first select the personality Tom Jones 809 in which he or she is interested, and then further browse into the specific type of content he or she is seeking 810. The dynamically-formed concept cluster Tom Jones 808 can contain sub-clusters as well as content items, e.g., "She's a lady".

Figure 9:
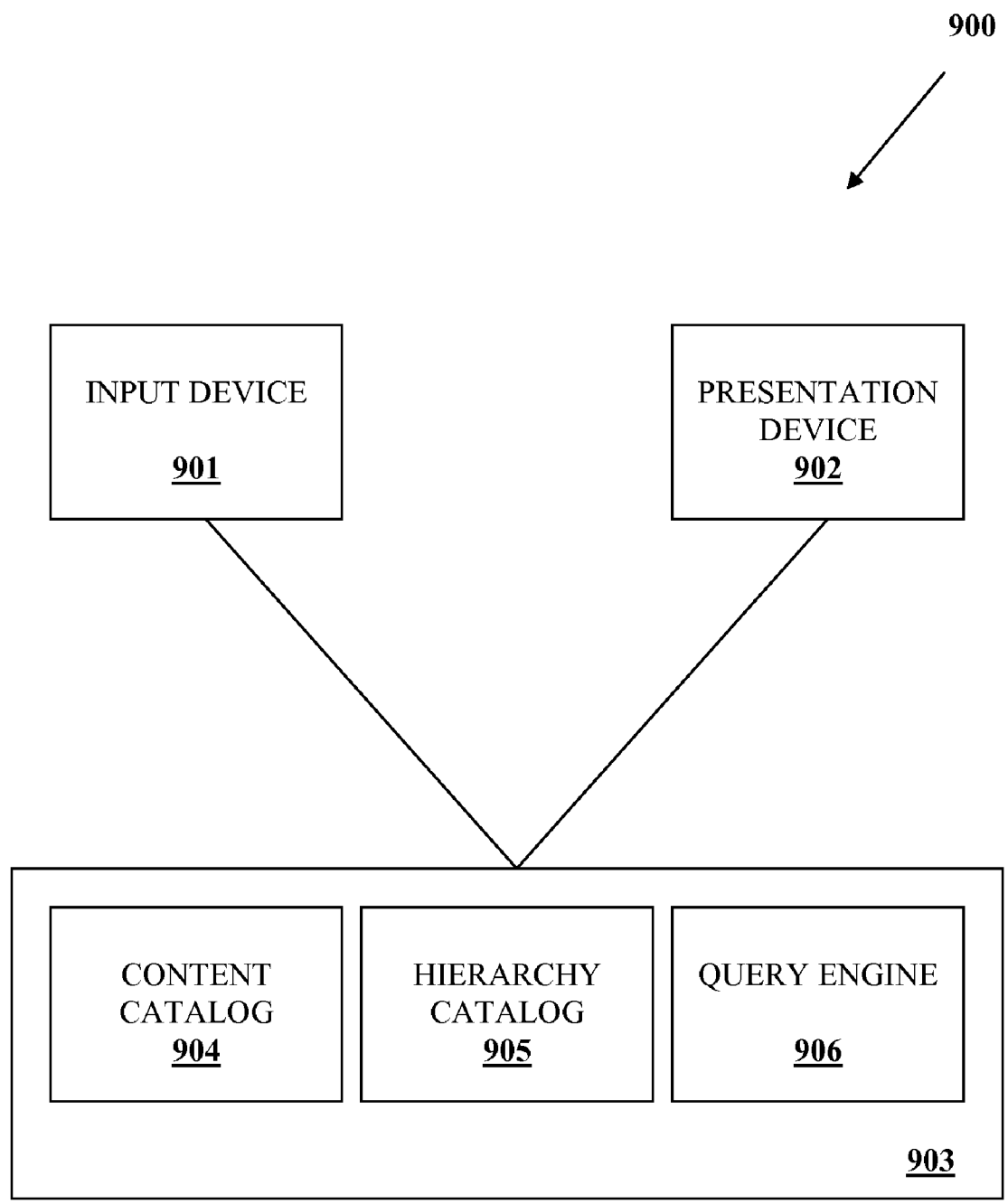
FIG. 9 illustrates a content system for the selection, reorganization, and presentation of content items.

FIG. 9 is an illustration of a content system 900 for use with the techniques described herein. In one implementation, the content system 900 has an input device 901 for receiving the user's search input and a presentation device 902 for presenting the selected content items in the dynamically-generated hierarchy. The input device 901 has a keypad and/or navigation interface, described below, to enable the user to enter query input. The presentation device 902 has a presentation screen for displaying content item search results and the content itself. The input and presentation devices 901, 902 could be the same device, as in the case of, for example, a mobile telephone, a PDA, or any other handheld computing device. Such a device may have a full QWERTY keyboard or equivalent, or the device may be an input-constrained device. Input constrained devices typically have limited input capabilities compared to devices having full keyboards. The 12-button keypad of a typical mobile phone provides one example of an input constrained device. The input device 901 and presentation device 902 can also be separate devices. For example, a television remote control can serve as the input device 901, while the television itself is the presentation device 902.

The system 900 also includes a content provider 903 for maintaining and providing content to the presentation device 902. The content provider 903 has a content catalog 904, a hierarchy catalog 905, and a query processing engine 906. The content catalog 904 contains the content items and associated data, such as the metadata terms that describe the various content items. The hierarchy catalog 905 contains the various concept cluster hierarchies associated with the content items, as described above. The query processing engine 906 receives the user query input and selects content items matching the query input (see the incorporated applications for examples of content item selection techniques).

The components of the content provider 903 can be present in a single server machine, or can be divided among multiple networked machines. Likewise, the various components can be combined or distributed in a number of ways. For example, the content catalog 904 can also store the hierarchies associated with the content items. In addition, a listing of the content items, the associated metadata, and the hierarchy information could be stored separately from the content items. This would enable the content list and associated data to be stored on the input device 901 and/or presentation device 902, while the actual content itself would be retained remotely. In some implementations, some or a portion of the content itself can be stored on the input device 901 and/or the presentation device 902.

The input device 901 communicates the user input to the content provider 903, and the content provider 903 returns the appropriate content item results to the presentation device 902, using the techniques described and incorporated above. The components of system 900 can communicate by a variety of known networking methods, including wired and wireless methods.

Figure 10:
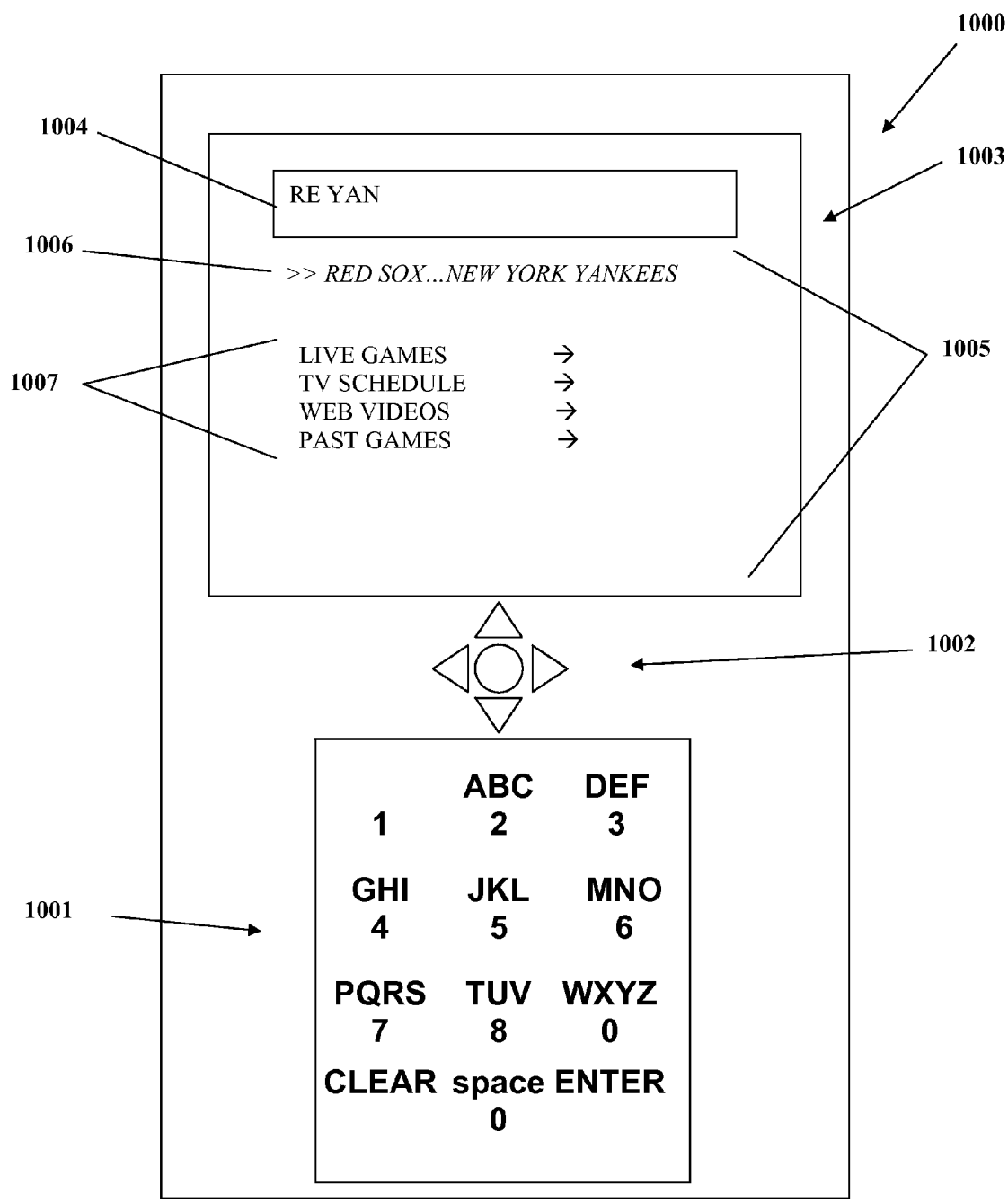
FIG. 10 illustrates a user device for selecting, reorganizing, and presenting selected content items.

FIG. 10 illustrates a user device 1000 for use with the techniques and systems described above. The user device 1000 provides one example of a device that serves as both the input device 901 and presentation device 902 of FIG. 9. The user device 1000 has a keypad 1001 with a full or input-constrained keypad for text entry and a navigation interface 1002, such as a five-button navigation interface, for enabling the user to browse the content items hierarchies, content item results, or content items themselves. The user device 1000 also includes a presentation area 1003 for displaying content items, hierarchies, and content item result lists. Presentation area 1003 includes a query display area 1004 for displaying the user's query input and a content display area 1005 for presenting the content items that have been grouped into the dynamically-formed concept clusters. The content display area 1005 can be further divided into a cluster identification area 1006 for displaying the currently selected cluster and a hierarchy display area 1007 for displaying content items or sub-clusters grouped under the selected cluster.

Note that the organization of information for browse purposes may differ from the hierarchy used for the presentation of dynamically-formed concept clusters. Furthermore, the incremental search input could have orthographic or typographic errors. The methods described in the incorporated applications can be used to overcome such errors and (1) enable the present methods to match the partial prefix input containing these errors with results and (2) generate dynamic cluster hierarchies, wherever meaningful.

This form of non-lexical concept-driven clustering of content item search results greatly enhances the user experience on display and/or input constrained devices such as television, cell phones, and PDA (personal digital assistants) because the user can discover the results of interest with minimal effort. However, methods and techniques described herein can be used with other user interfaces, for example, standard keyboards and/or mouse devices to achieve similar benefits.

It will be appreciated that the scope of the present invention is not limited to the above-described embodiments, but rather is defined by the appended claims, and these claims will encompass modifications of and improvements to what has been described. For example, the embodiments provided above are described in terms of providing audio/video content. However, the techniques, methods, and systems described and incorporated herein can be implemented with other content, such as address book entries, contact information, personal schedule information, or other types of data. In addition, a wide variety of physical devices can employ the techniques disclosed herein, e.g., PDAs, mobile telephones, and handheld PCs. These types of devices share many of the same constraints, namely, limited input and/or output capabilities, and thus, can benefit from aspects of the invention provided herein.

What is claimed is:

1. A computer implemented method of searching for and presenting content items as an arrangement of one or more concept clusters to facilitate further search and navigation using at least one of a display-constrained display device and/or an input-constrained input device, the method comprising:

accessing an electronically-readable storage medium containing a candidate set of content items;

organizing at least some content items of the candidate set of content items into a hierarchical set of concept clusters, wherein at least two concept clusters in the hierarchical set of concept clusters each includes a respective set of content items, wherein the content items within each of the respective sets are related by one or more common themes or information types, and wherein at least one concept cluster in the hierarchical set of concept clusters has one or more cluster identifiers, and wherein at least one concept cluster in the hierarchical set of concept clusters is a parent cluster and comprises a child cluster; and receiving user input comprising more than one search term;

identifying a concept cluster in the hierarchical set of concept clusters that has one or more cluster identifiers matching the user input, wherein the concept cluster in the hierarchical set of concept clusters having one or more cluster identifiers matching the user input is a parent cluster of a child cluster having a child cluster identifier;

generating a flattened cluster based on a combination of the parent cluster in the hierarchical set of concept clusters having one or more cluster identifiers matching the user input and the child cluster of the parent cluster in the hierarchical set of concept clusters having one or more cluster identifiers matching the user input; and presenting the flattened cluster on the display device.

2. The method of claim 1, wherein the display device is a television and the input device is a remote control of the television.

3. The method of claim 1, further comprising;

determining a selected concept cluster, the selected concept cluster having one or more concept child-clusters; and presenting on the display device the one or more concept child-clusters of the selected concept cluster, wherein presentation of the one or more concept child-clusters of the selected concept cluster is based at least in part on the current time.

4. A system for searching for and presenting content items as an arrangement of one or more concept clusters to facilitate further search and navigation using at least one of a display-constrained display device and/or an input-constrained input device, the system comprising:

at least one machine configured to perform steps of:

accessing an electronically-readable storage medium containing a candidate set of content items;

organizing at least some content items of the candidate set of content items into a hierarchical set of concept clusters, wherein at least two concept clusters in the hierarchical set of concept clusters each includes a respective set of content items, wherein the content items within each of the respective sets are related by one or more common themes or information types, and wherein at least one concept cluster in the hierarchical set of concept clusters has one or more cluster identifiers, and wherein at least one concept cluster in the hierarchical set of concept clusters is a parent cluster and comprises a child cluster, and receiving user input comprising more than one search term;

identifying a concept cluster in the hierarchical set of concept clusters that has one or more cluster identifiers matching the user input, wherein the concept cluster in the hierarchical set of concept clusters having one or more cluster identifiers matching the user input is a parent cluster of a child cluster having a child cluster identifier;

generating a flattened cluster based on a combination of the parent cluster in the hierarchical set of concept clusters having one or more cluster identifiers matching the user input and the child cluster of the parent cluster in the hierarchical set of concept clusters having one or more cluster identifiers matching the user input; and presenting the flattened cluster on the display device.

5. The system of claim 4, wherein the display device is a television and the input device is a remote control of the television.

6. The system of claim 4, wherein the at least one machine is configured to perform the further steps of:

determining a selected concept cluster, the selected concept cluster having one or more concept child-clusters; and presenting on the display device the one or more concept child-clusters of the selected concept cluster, wherein presentation of the one or more concept child-clusters of the selected concept cluster is based at least in part on the current time.

7. The method of claim 1, wherein presenting the flattened cluster is based at least in part on a combination of the one or more cluster identifiers matching the user input and the child cluster identifier.

8. The system of claim 4, wherein presenting the flattened cluster is based at least in part on a combination of the one or more cluster identifiers matching the user input and the child cluster identifier.

* * * * *